US010436930B2

(12) United States Patent
Wu et al.

(10) Patent No.: US 10,436,930 B2
(45) Date of Patent: Oct. 8, 2019

(54) TUNABLE DIPOLE MOMENT FOR FORMATION MEASUREMENTS

(71) Applicant: Halliburton Energy Services, Inc., Houston, TX (US)

(72) Inventors: Hsu-Hsiang Wu, Sugar Land, TX (US); Jin Ma, Singapore (SG); Joseph Keith Young, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 48 days.

(21) Appl. No.: 15/550,612

(22) PCT Filed: Oct. 4, 2016

(86) PCT No.: PCT/US2016/055328
§ 371 (c)(1),
(2) Date: Aug. 11, 2017

(87) PCT Pub. No.: WO2018/067126
PCT Pub. Date: Apr. 12, 2018

(65) Prior Publication Data
US 2018/0239048 A1 Aug. 23, 2018

(51) Int. Cl.
*G01V 3/28* (2006.01)
*G01V 3/18* (2006.01)
(Continued)

(52) U.S. Cl.
CPC .................. *G01V 3/28* (2013.01); *G01V 3/18* (2013.01); *G01V 3/26* (2013.01); *G01V 3/38* (2013.01)

(58) Field of Classification Search
CPC combination set(s) only.
See application file for complete search history.

(56) References Cited

U.S. PATENT DOCUMENTS 6,163,155 A * 12/2000 Bittar .................... G01V 3/28
324/338
6,181,138 B1 * 1/2001 Hagiwara ......... E21B 47/02216
324/338
(Continued)

OTHER PUBLICATIONS

International Search Report and Written Opinion issued in related PCT Application No. PCT/US2016/055328 dated Jun. 29, 2017, 14 pages.

*Primary Examiner* — Tung X Nguyen
*Assistant Examiner* — Dominic E Hawkins
(74) *Attorney, Agent, or Firm* — Jason Sedano; Baker Botts L.L.P.

(57) ABSTRACT

In accordance with presently disclosed embodiments, a system and method for determining a measurement for a pseudo receiver antenna with a different lateral position and a different azimuthal direction than at least two receiver antennas disposed on one or more wellbore tools is provided. The method involves transmitting an electromagnetic signal into a subterranean formation surrounding a borehole, and measuring one or more responses of the subterranean formation to the electromagnetic signal using at least two receiver antennas. The two receiver antennas are oriented in differing azimuthal directions relative to one or more tools to which the receiver are coupled, and arranged in a non-parallel angular orientation with respect to each other. The method then includes determining a response measured by a pseudo receiver antenna with a desired angular orientation and a desired azimuthal direction with respect to the one or more tools.

20 Claims, 3 Drawing Sheets

(51) Int. Cl.
*G01V 3/26* (2006.01)
*G01V 3/38* (2006.01)

(56) References Cited

U.S. PATENT DOCUMENTS

| | | | |
|---|---|---|---|
| 6,476,609 B1 | 11/2002 | Bittar | |
| 7,557,580 B2 | 7/2009 | Bittar | |
| 7,898,259 B2 | 3/2011 | Hall et al. | |
| 7,948,238 B2 | 5/2011 | Bittar | |
| 8,159,227 B2 | 4/2012 | Wang | |
| 8,466,683 B2* | 6/2013 | Legendre | G01V 3/28 324/339 |
| 2005/0174886 A1* | 8/2005 | Fuller | G01V 1/28 367/57 |
| 2006/0285439 A1* | 12/2006 | Haugland | G01V 1/48 367/75 |
| 2009/0309600 A1 | 12/2009 | Seydoux et al. | |
| 2010/0118658 A1* | 5/2010 | Showen | G01S 5/18 367/127 |
| 2015/0088426 A1* | 3/2015 | Tang | G01V 3/24 702/7 |

\* cited by examiner

TUNABLE DIPOLE MOMENT FOR FORMATION MEASUREMENTS

CROSS-REFERENCE TO RELATED APPLICATION

The present application is a U.S. National Stage Application of International Application No. PCT/US2016/055328 filed Oct. 4, 2016, which is incorporated herein by reference in its entirety for all purposes.

TECHNICAL FIELD

The present disclosure relates generally to wireline and well drilling operations and, more particularly, to a tunable dipole moment for subterranean formation measurements.

BACKGROUND

Hydrocarbons, such as oil and gas, are produced from subterranean reservoir formations that may be located onshore or offshore. The processes involved in recovering hydrocarbons from a reservoir are becoming increasingly complex. Typically, subterranean production involves a number of different steps such as, for example, drilling a wellbore at a desired well site and optimizing well placement within the reservoir, treating the wellbore to optimize production of hydrocarbons, and performing the necessary steps to produce, process and transport the hydrocarbons from the reservoir.

Measurements of the geological formation may be made throughout various wireline and well drilling operations using electromagnetic logging techniques. One example technique includes the use of an induction logging tool that can be used to determine resistivity (or its inverse, conductivity) of the geological formations in the proximity of the borehole. Generally, at discrete measurement points within the borehole, a transmitter of the induction logging tool transmits an electromagnetic signal that passes through the geological formation around the borehole and induces a signal in one or more receivers in the induction logging tool. The properties of the signal received, such as its amplitude and/or phase, are influenced by the formation resistivity. Analyzing these signals to determine the formation resistivity and other properties is collectively known as formation evaluation.

In typical logging tools, the one or more receivers are tilted, with the received measurements being focused in the azimuthal direction of the receivers' magnetic moments. To ensure that the entire formation around the tool is measured, the receivers or the tool to which they are coupled are typically rotated. This rotation, however, can be problematic and introduce noise into the measurements. Additionally, the resulting measurements are generally limited to the lateral location of the antennas within the wellbore and their angular orientation with respect to the tool. Further, in systems where multiple transmitter antennas or receiver antennas are laid over each other, the resulting measurements are limited to the lateral location of the antennas within the wellbore.

BRIEF DESCRIPTION OF THE DRAWINGS

Some specific exemplary embodiments of the disclosure may be understood by referring, in part, to the following description and the accompanying drawings.

FIGS. 3A-C are diagrams illustrating an example antenna configuration for a resistivity logging system, according to aspects of the present disclosure.

Figure 1:
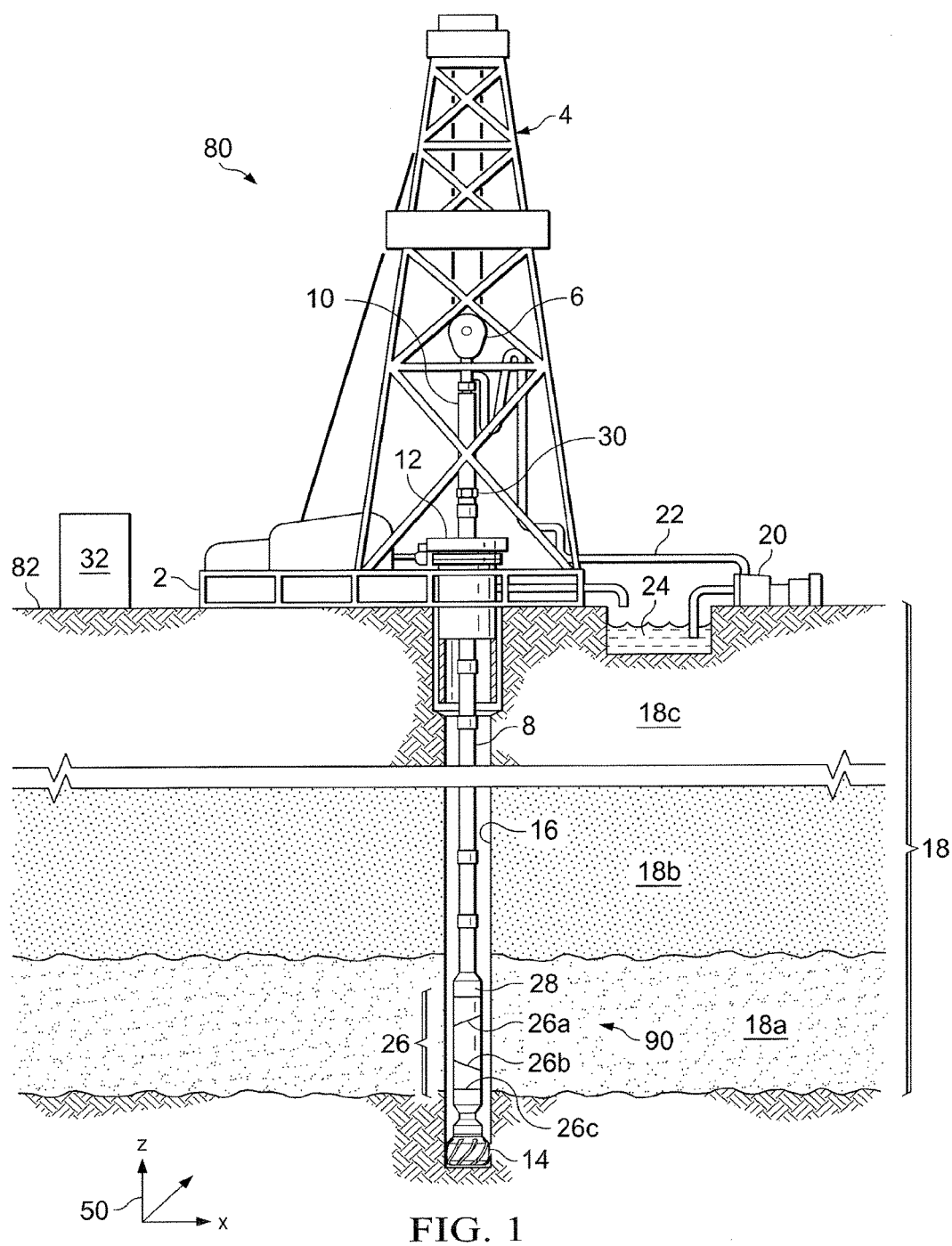
FIG. 1 is a diagram of an example subterranean drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection or monitoring wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques for formation evaluation. Devices and methods in accordance with certain embodiments may be used in one or more of wireline (including wireline, slickline, and coiled tubing), downhole robot, MWD, and LWD operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical, electromagnetic, or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

FIG. 1 is a diagram of a subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) 90 coupled to the drill string 8 near the drill bit 14. The BHA 90 may comprise various downhole measurement tools and sensors and LWD and MWD elements, including one or more logging tools 26. As the hit extends the borehole 16 through the formations 18, the tools 26 may collect measurements relating to borehole 16 and the resistivity of the formation 18. The tools 26 may also collect measurements regarding the conductivity, permittivity, permeability, chargeability and other induced polarization parameters of the formation 18. In certain embodiments, the orientation and position of the tools 26 may be tracked using, for example, an azimuthal orientation indicator, which may include magnetometers, inclinometers, and/or accelerometers, though other sensor types such as gyroscopes may be used in some embodiments.

In the embodiment shown, a tool 26 comprises a plurality of antennas 26a-c coupled thereto. The antennas 26a-c may be used to transmit electromagnetic signals into the formation 18 and to measure responses of the formation 18 to the transmitted electromagnetics signals as part of a process to determine resistivity characteristics of the formation 18. Antennas 26a and 26b may comprise receiver antennas that are each coupled to the tool 26. Antenna 26c may comprise a transmitter antenna coupled to the tool 26.

Note that although a single tool 26 is illustrated in FIG. 1, in some embodiments the one or more tools 26 may comprise multiple tools (or tool subs) with individual tool bodies that are mechanically connected through threaded connections, for example. In such instances, each tool or tool sub may include its own position/orientation tracking devices, such as an azimuthal orientation indicator (e.g., magnetometers, inclinometers, and/or accelerometers).

As depicted, the receiver antennas 26a and 26b are arranged in a non-parallel orientation with respect to each other, with both being arranged at skewed angles with respect to the longitudinal axis of the tool 26. The antennas 26a and 26b are also laterally offset from each other with respect to the longitudinal axis of the tool 26, and may be azimuthally offset with respect to each other, as will be described in detail below. As illustrated, the transmitter antenna 26c may be at a non-skewed angle with respect to the longitudinal axis of the tool 26. In other embodiments, the transmitter antenna 26c may be at a skewed angle with respect to the longitudinal axis of the tool 26. The transmitter antenna 26c is also laterally offset from the receiver antennas 26a and 26b with respect to the longitudinal axis of the tool 26. It should be appreciated that the orientation, configuration, and number of the antennas 26a-c are not limited to the orientation, configuration, and number depicted in FIG. 1.

The tools and sensors of the BHA 90 including the logging tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 82. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data. In certain embodiments, the surface control unit 32 may comprise a plurality of information handling systems arranged in a serial or parallel architecture to receive and process downhole measurement data.

In the embodiment shown, the surface control unit 32 is communicably coupled to the surface receiver 30 to receive measurements from the tool 26 and/or transmit commands to the tool 26 though the surface receiver 30. The surface control unit 32 may also receive measurements from the tool 26 when the tool 26 is retrieved at the surface 102. The surface control unit 32 may process some or all of the measurements from the tool 26, as described in detail below, to determine characteristics of the formation 18, including the locations of boundaries between and the resistivity of the rock strata or layers 18a-c. In certain embodiments, some or all of the processing steps may also be performed at an information handling system at a remote location from the drilling system.

Figure 2:
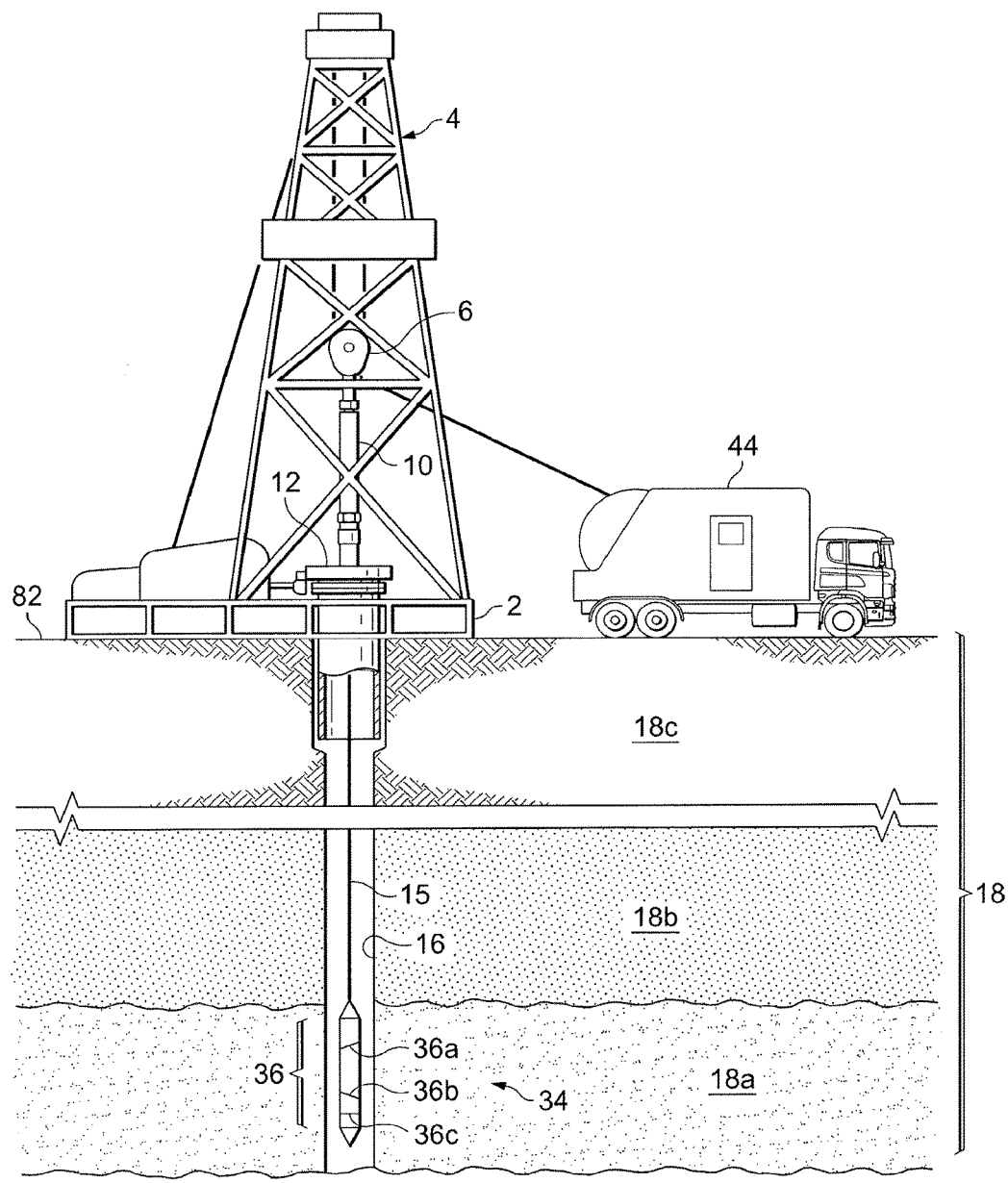
FIG. 2 is a diagram of an example subterranean drilling system with the drill string removed, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise one or more logging tools 36 with a plurality of antennas 36a-c, similar to the tool 26 and antennas 26a-c described above. The tool 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

Logging tools, such as those described above with reference to FIGS. 1 and 2, may take periodic measurements at different depths and times as they progress into the formation. At each measurement point, it may be beneficial to identify measurements and characteristics at every azimuthal angle around tool, so that the formation can be fully characterized. In one existing tool, a tilted antenna is rotated in order generate measurements at every azimuthal orientation around the tool at the formation depth at which the tool is positioned. In other existing tools, multiple tilted antenna are positioned at the same location on a tool to take measurements from which azimuthal measurements can be determined. In both instances, however, the resulting measurements are limited to the antenna location and/or orientation with respect to the tool.

Figure 3B:
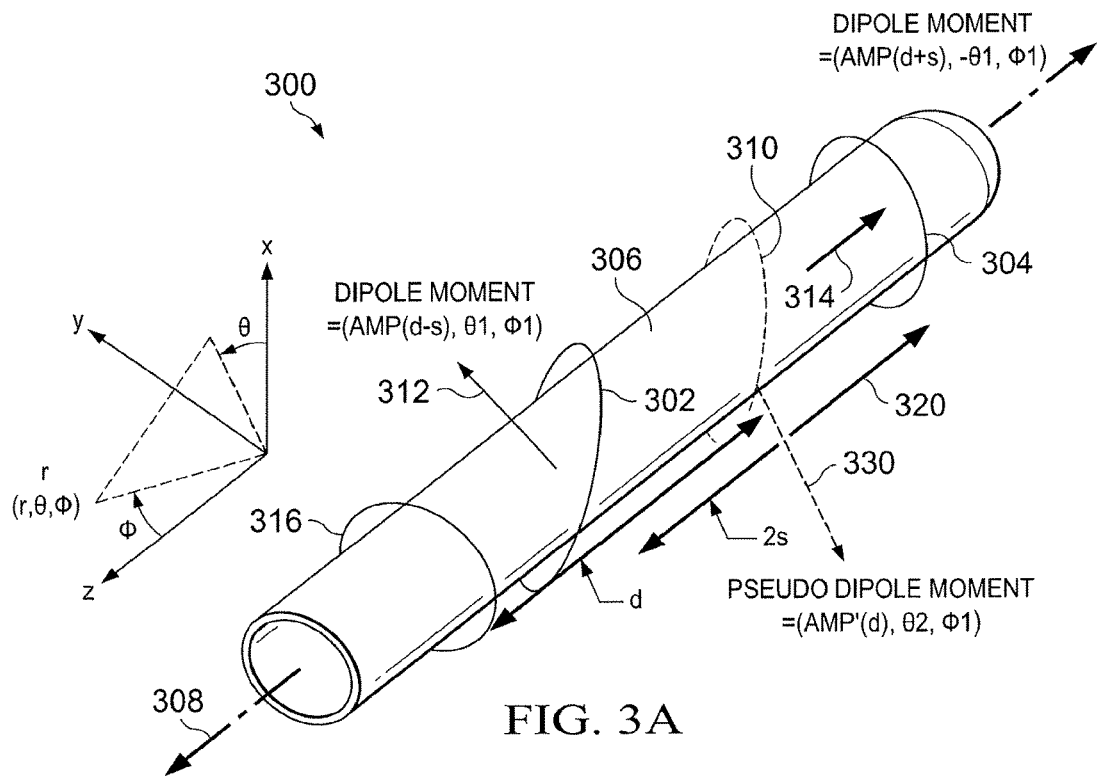
Figure 3B:
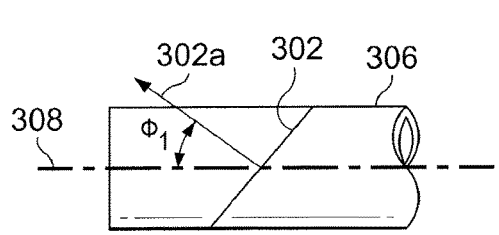
Figure 3C:
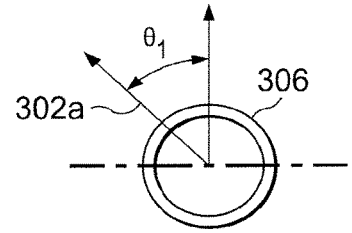

The present disclosure is directed to resistivity logging systems and methods in which resistivity measurements associated with an arbitrarily located and oriented pseudo antenna can be created. FIGS. 3A-C are diagrams illustrating an example antenna configuration for a resistivity logging system 300, according to aspects of the present disclosure. The system 300 includes a first receiver antenna 302 and a second antenna 304 coupled to a cylindrical tool body 306 characterized by a longitudinal axis 308. Although only one cylindrical tool body 306 is shown, it should be appreciated that the first receiver antenna 302 and a second antenna 304 may be coupled to different tools and tool bodies, including different tools or tool bodies that are mechanically connected by threaded connections and/or by other intermediate tools or tool bodies.

The first receiver antenna 302 and the second receiver antenna 304 may be laterally separated along the tool body 306 by a distance 320, and may be characterized by tilt angles and azimuthal angles with respect to the tool body. As shown in FIG. 3B with reference to first receiver antenna 302, the tilt angle $\Phi_1$ of the first receiver antenna 302 may correspond to the angle between the longitudinal axis 308 of the tool body 306 and a normal 302a of the plane in which the antenna 302 is positioned. As shown in FIG. 3C with reference to first receiver antenna 302, the azimuthal angle $\theta_1$ of the first receiver antenna 302 may correspond to the angle of the normal 302a with respect to the circumference of the tool body 306. The second antenna 304 may be similarly characterized by a tilt angle $\Phi_2$ and an azimuthal angle $\theta_2$ determined using the same parameters.

As depicted, the tilt angle $\Phi_1$ of the first receiver antenna 302 and the tilt angle $\Phi_2$ of the second receiver antenna 304 are different, non-zero angles, such that the antenna 302/304 are arranged in a non-parallel orientation with respect to one another and in a skewed or tilted orientation with respect to the tool body 306. Additionally, the azimuthal angle $\theta_1$ of the first receiver antenna 302 and the azimuthal angle $\theta_2$ of the second receiver antenna 304 differ such that the antenna 302/304 are pointed at different angles with respect to the circumference of the tool. It should be appreciated that the antenna configurations depicted are not intended to be limiting.

Each of the first receiver antenna 302 and the second antenna 304 may be characterized by a dipole moment, indicated respectively by arrows 312 and 314. The dipole moments 312 and 314 may correspond to the direction in which the corresponding antenna 302/304 is sensitive to electromagnetic signals. The dipole moments 312 and 314 may comprise normal vectors to the corresponding antenna 302/304 such that their direction can be characterized by the tilt and azimuthal angles of the antenna 302/304. The amplitude of the dipole moment vectors 312 and 314 may depend in part on the distance between the respective antennas 302/304 and a transmitter antenna 316 that transmits the electromagnetic signal. For instance, assuming the antenna 302 is positioned a distance $d_1$ from the transmitter antenna 316, the amplitude of the dipole moment 312 may be represented as $Amp(d_1)$. Similarly, assuming the antenna 304 is positioned a distance $d_2$ from the transmitter antenna 316, the amplitude of the dipole moment 314 may be represented as $Amp(d_2)$. Based on the above, the dipole moments 312 and 314 may be respectively characterized in a spherical coordinate system as $(Amp(d_1), \theta_1, \Phi_1)$ and $(Amp(d_2), \theta_2, \Phi_2)$.

According to aspects of the present disclosure, the physical antenna 302/304 and corresponding dipole moments 312/314 can be combined to generate an example pseudo antenna 310 with a dipole moment 330 characterized by unique tilt and azimuthal angles. For instance, assuming that the distance 330 between the antenna 302/304 comprises 2s, the pseudo antenna 310 is positioned at a distance d from the transmitter 316 and a distance s from each of the antennas 302 and 304, the tilt angle $\Phi_2 = \Phi_1$, and the azimuthal angle $\theta_2 = -\theta_1$ then the dipole moment 312 may be represented as (Amp(d−s), $\theta_1$, $\Phi_1$) in spherical coordinates and (Amp(d−s)sin($\Phi_1$)cos($\theta_1$), Amp(d−s)sin($\Phi_1$)sin($\theta_1$), Amp(d−s)cos($\Phi_1$)) in Cartesian coordinates; and the dipole moment 314 may be represented as (Amp(d+s), $-\theta_1$, $\Phi_1$) in spherical coordinates and (Amp(d+s)sin($\Phi_1$)cos($\theta_1$), −Amp(d+s)sin($\Phi_1$)sin($\theta_1$), Amp(d+s)cos($\Phi_1$)). Combining these dipole moment provides a pseudo dipole moment of (2Amp(d)sin($\Phi_1$)cos($\theta_1$), 0, 2Amp(d)cos($\Phi_1$)). Based on this combination, the pseudo dipole moment can be translated to any tunable antenna orientation in a spherical coordinate system by defining the corresponding dipole moment amplitude, tilt angle, and azimuth angle. For example, a pseudo dipole moment of (Amp'(d), 0, $\phi$') in a spherical coordinate system may represent the sum of two physical antenna, such as those illustrated in FIG. 3A, resulting in the equations (1) and (2)

$$Amp'(d)\sin \phi' = 2Amp(d)\sin(\phi 1)\cos(\Theta 1) \quad (1)$$

$$Amp'(d)\cos \phi' = 2Amp(d)\cos(\phi 1) \quad (2)$$

Based on equations (1) and (2), the following relationships can be derived:

$$Amp'(d) = 2Amp(d)\sqrt{\sin^2(\phi 1)\cos^2(\Theta 1) + \cos^2(\phi 1)}$$

$$\phi' = \tan^{-1}(\tan(\phi 1)\cos(\Theta 1))$$

Using those relations, a new equivalent dipole moment can be calculated to present a pseudo antenna located at new tilted angle and new tool azimuth angle with new dipole moment amplitude.

A similar approach may be used to generate a pseudo antenna 310 at any lateral position along the tool body 306 (e.g., not limited to a location half-way between the two antennas 302 and 304). This may involve manipulating the variables for the spherical coordinates for the calculated dipole moments by weighting the variables (e.g., d and s) differently based on the desired lateral location of the pseudo antenna 310. In addition, in some embodiments, one the antennas 302 and 304 may be operated as a transmitter while the antenna 316 is operated as a receiver. The operation of the antennas 302, 304, and 316 may be switched between transmitter and receiver functions as desired throughout operation of the tool. This may enable the tool to determine an equivalent dipole moment for a pseudo antenna located at a different position along the length of the tool body 306. For example, if the antenna 316 is operated as a receiver and the antenna 304 is operated as a transmitter, the pseudo antenna generated using the above equations may be located between the antennas 302 and 316.

Figure 4:
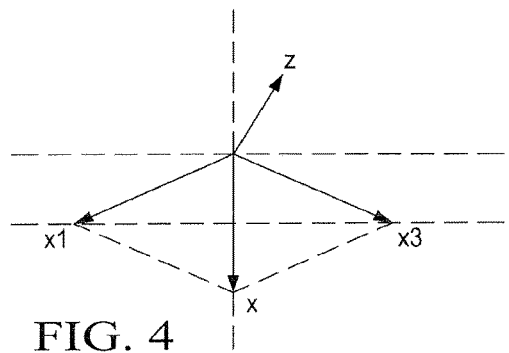
FIG. 4 is a diagram of an example vector decomposition representing two receiver antennas and a pseudo dipole moment generated from measurements by the two receiver antennas, according to aspects of the present disclosure.

In certain embodiments, the new dipole moment may be used to process measurements from the physical antenna to determine measurements for the pseudo antenna from which one or more characteristics within the associated formation may be determined. Processing the measurements can include, for instance, averaging the tilt and azimuthal angles from the physical antenna using a space angle concept to determine the tilt and azimuthal angles of an associated pseudo antenna. For instance, with reference to FIG. 4, which illustrates an example vector decomposition, a first receiver antenna R1 with a tilt angle of 45° and an azimuthal angle of −120° may be represented by a vector x1 and a second receiver antenna R3 with a tilt angle of 45° and an azimuthal angle of 120° may be represented by a vector x3. Based on FIG. 4, the tilt angle, azimuthal angle, and amplitude of the dipole moment corresponding to the pseudo antenna may be determined using the following equations $$B_{zavg} = B_{zR1} + B_{zR3}$$

$$B_{xavg} = B_{xR1}\sin(30°) + B_{xR3}\sin(30°)$$

$$Dip_{avg} = -\arctan(B_{xavg}/B_{zavg}) = -\arctan(1/2)$$

$$Amp_{avg} = \sqrt{B_{xavg}^2 + B_{zavg}^2} = \sqrt{5/2}Amp_{R1}$$

where $B_{xR1}$, $B_{yR1}$, and $B_{zR1}$, respectively correspond to the magnetic components of the R1 dipole moment in the x-, y-, and z-directions; $B_{xR3}$, $B_{yR3}$, and $B_{zR3}$, respectively correspond to the magnetic components of the R3 dipole moment in the x-, y-, and z-directions; $B_{xavg}$ and $B_{zang}$ respectively correspond to the magnetic components of the pseudo dipole moment in the x- and z-direction; $Dip_{avg}$ corresponds to the dip angle of the pseudo antenna; and $Amp_{avg}$ corresponds to the amplitude of the pseudo dipole moment. Using these calculations, the measurements associated with the pseudo dipole can be calculated from the raw measurements generated by the receivers R1 and R3, and the calculated pseudo dipole measurements can be compared, for instance, with expected results from formation modeling to verify results. The resulting measurements can also be used to determine features of the formation, such as bed boundaries, and the operational parameters, such as drilling angle, may be altered based, at least in part, on the determined features.

Embodiments disclosed herein include:

A. A system including at least one transmitter antenna positioned in a borehole within a subterranean formation and configured to transmit a signal into a subterranean formation, and at least two receiver antennas coupled to one or more tools positioned in the borehole within the subterranean formation and configured to receive one or more measurements of the subterranean formation associated with the transmitted signal. The at least two receiver antennas are arranged at different lateral positions with respect to the borehole; in a non-parallel orientation with respect to each other; and in differing azimuthal directions relative to the one or more tools. The system also includes an information handling system communicably coupled to the at least two receivers. The information handling system is configured to receive the one or more measurements from the at least two receiver antennas and determine a measurement for a pseudo receiver antenna with a different lateral position and a different azimuthal direction than the at least two receiver antennas based, at least in part, on the received measurements.

B. A method including transmitting an electromagnetic signal into a subterranean formation surrounding a borehole. The method also includes measuring one or more responses of the subterranean formation to the electromagnetic signal using at least two receiver antennas that are oriented in differing azimuthal directions relative to one or more tools to which the receiver are coupled, and arranged in a non-parallel angular orientation with respect to each other. The method further includes determining a response measured by a pseudo receiver antenna with a desired angular orientation and a desired azimuthal direction with respect to the tool body.

C. A method including generating a first signal representing a first azimuthally sensitive measurement of a phase shift and attenuation of an electromagnetic signal propagating through a formation around a borehole. The method also includes generating a second signal representing a second azimuthally sensitive measurement of phase shift and attenuation of an electromagnetic signal propagating through the formation around a borehole, wherein the azimuthal sensitivity of the first measurement is in a direction different than that of the second measurement. The method further includes determining a pseudo dipole orientation having a maximum dipole amplitude synthesized from the first and second signals.

Each of the embodiments A, B, and C may have one or more of the following additional elements in combination: Element 1: wherein the at least two receiver antennas are oriented at a skew angle from the axis of the one or more tools. Element 2: wherein the at least two receiver antennas are oriented at 45° angles from the axis of the one or more tools. Element 3: wherein the at least two receiver antennas are oriented in differing azimuthal directions of −30° and 30° relative to the one or more tools. Element 4: wherein at least one transmitter antenna is coupled to the one or more tools and is oriented perpendicular to the axis of the one or more tools. Element 5: wherein the at least one transmitter antenna is coupled to the one or more tools and is oriented at a skew from the axis of the one or more tools. Element 6: wherein each transmitter and each receiver antenna is coupled to a different tool within a bottom hole assembly positioned within the borehole. Element 7: wherein each tool includes at least one of a magnetometers, an inclinometers, and an accelerometer to measure the relative orientation of the associated antenna. Element 8: further including at least two transmitter antennas configured to transmit signals into the subterranean formation, wherein the at least two transmitter antennas are each oriented at a skew angle from the axis of the one or more tools, and wherein the at least two transmitter antennas are oriented in differing azimuthal directions relative to the one or more tools.

Element 9: wherein the at least two receiver antennas are oriented at a skew angle from the axis of the one or more tools. Element 10: wherein the at least two receiver antennas are oriented at 45° angles from the axis of the one or more tools. Element 11: wherein the at least two receiver antennas are oriented in differing azimuthal directions of −30° and 30° relative to the one or more tools. Element 12: wherein transmitting the electromagnetic signal into the subterranean formation surrounding the borehole comprises transmitting the electromagnetic from at least one transmitter antenna positioned within the borehole, wherein the at least one transmitter antenna is at least one of: coupled to the one or more tools and is oriented perpendicular to the axis of the one or more tools; or coupled to the one or more tools and is oriented at a skew from the axis of the one or more tools. Element 13: wherein each transmitter and each receiver antenna is coupled to a different tool within a bottom hole assembly positioned within the borehole. Element 14: wherein each tool comprises at least one of a magnetometer, an inclinometer, and an accelerometer to measure the relative orientation of the associated antenna. Element 15: wherein the at least two transmitter antennas are each oriented at a skew angle from the axis of the one or more tools, and wherein the at least two transmitter antennas are oriented in differing azimuthal directions relative to the one or more tools. Element 16: further including determining a response measured by a pseudo receiver antenna tuned to any desired angular orientation, azimuthal direction, and lateral location with respect to the tool body. Element 17: further including determining one or more characteristics of the formation based, at least in part, on the determined pseudo receive antenna measurement; and altering an operating condition of at least one tool in the borehole based, at least in part, on the one or more characteristics of the formation.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A system, comprising:
at least one transmitter antenna positioned in a borehole within a subterranean formation and configured to transmit a signal into a subterranean formation;
at least two receiver antennas coupled to one or more tools positioned in the borehole within the subterranean formation and configured to receive one or more measurements of the subterranean formation associated with the transmitted signal, wherein the at least two receiver antennas are arranged:
at different lateral positions with respect to the borehole;
in a non-parallel orientation with respect to each other; and
in differing azimuthal directions relative to the one or more tools; and
an information handling system communicably coupled to the at least two receiver antennas, wherein the information handling system is configured to:
receive the one or more measurements from the at least two receiver antennas; and
determine a measurement for a pseudo receiver antenna with a different axial position along a length of the one or more tools than the at least two receiver antennas and a different azimuthal direction than the at least two receiver antennas based, at least in part, on the received one or more measurements.

2. The system of claim 1, wherein the at least two receiver antennas are oriented at a skew angle from the axis of the one or more tools.

3. The system of claim 1, wherein the at least two receiver antennas are oriented at 45° angles from the axis of the one or more tools.

4. The system of claim 1, wherein the at least two receiver antennas are oriented in differing azimuthal directions of −30° and 30° relative to the one or more tools.

5. The system of claim 1, wherein the at least one transmitter antenna is coupled to the one or more tools and is oriented perpendicular to the axis of the one or more tools.

6. The system of claim 1, wherein the at least one transmitter antenna is coupled to the one or more tools and is oriented at a skew from the axis of the one or more tools.

7. The system of claim 1, wherein each transmitter antenna and each receiver antenna is coupled to a different tool within a bottom hole assembly positioned within the borehole.

8. The system of claim 7, wherein each tool comprises at least one of a magnetometer, an inclinometer, and an accelerometer to measure a relative orientation of the at least one transmitter antenna or one of the at least two receiver antennas coupled to the tool.

9. The system of claim 1, further comprising at least two transmitter antennas configured to transmit signals into the subterranean formation, wherein the at least two transmitter antennas are each oriented at a skew angle from the axis of the one or more tools, and wherein the at least two transmitter antennas are oriented in differing azimuthal directions relative to the one or more tools.

10. A method, comprising:
transmitting an electromagnetic signal into a subterranean formation surrounding a borehole;
measuring one or more responses of the subterranean formation to the electromagnetic signal using at least two receiver antennas that are at different lateral positions with respect to the borehole, oriented in differing azimuthal directions relative to one or more tools to which the receiver antennas are coupled, and arranged in a non-parallel angular orientation with respect to each other; and
determining a response measured by a pseudo receiver antenna with a different axial position along a length of the one or more tools than the at least two receiver antennas, a desired angular orientation, and a desired azimuthal direction with respect to the one or more tools.

11. The method of claim 10, wherein the at least two receiver antennas are oriented at a skew angle from the axis of the one or more tools.

12. The method of claim 10, wherein the at least two receiver antennas are oriented at 45° angles from the axis of the one or more tools.

13. The method of claim 10, wherein the at least two receiver antennas are oriented in differing azimuthal directions of −30° and 30° relative to the one or more tools.

14. The method of claim 10, wherein transmitting the electromagnetic signal into the subterranean formation surrounding the borehole comprises transmitting the electromagnetic signal from at least one transmitter antenna positioned within the borehole, wherein the at least one transmitter antenna is at least one of:
coupled to the one or more tools and is oriented perpendicular to the axis of the one or more tools; or
coupled to the one or more tools and is oriented at a skew from the axis of the one or more tools.

15. The method of claim 14, wherein each transmitter antenna and each receiver antenna is coupled to a different tool within a bottom hole assembly positioned within the borehole.

16. The method of claim 15, wherein each tool comprises at least one of a magnetometer, an inclinometer, and an accelerometer to measure a relative orientation of the at least one transmitter antenna or one of the at least two receiver antennas coupled to the tool.

17. The method of claim 10, wherein transmitting the electromagnetic signal into the subterranean formation surrounding the borehole comprises transmitting the electromagnetic signal from at least two transmitter antennas positioned within the borehole, wherein the at least two transmitter antennas are each oriented at a skew angle from the axis of the one or more tools, and wherein the at least two transmitter antennas are oriented in differing azimuthal directions relative to the one or more tools.

18. The method of claim 10, further comprising determining a response measured by a pseudo receiver antenna tuned to any desired angular orientation with respect to the one or more tools, azimuthal direction with respect to the one or more tools, and axial location along a length of the one or more tools.

19. The method of claim 10, further comprising
determining one or more characteristics of the formation based, at least in part, on the response measured by the pseudo receiver antenna; and
altering an operating condition of at least one tool in the borehole based, at least in part, on the one or more characteristics of the formation.

20. A method, comprising:
generating a first signal representing a first azimuthally sensitive measurement of a phase shift and attenuation of an electromagnetic signal propagating through a formation around a borehole, the first azimuthally sensitive measurement being collected from a first axial position along the borehole;
generating a second signal representing a second azimuthally sensitive measurement of phase shift and attenuation of an electromagnetic signal propagating through the formation around a borehole, wherein the azimuthal sensitivity of the first azimuthally sensitive measurement is in a direction different than that of the second azimuthally sensitive measurement, the second azimuthally sensitive measurement being collected from a second axial position along the borehole separated from the first axial position; and
determining a pseudo dipole orientation at a third axial position along the borehole different from the first and second axial positions and having a maximum dipole amplitude synthesized from the first and second signals.

* * * * *